United States Patent Office 3,000,476
Patented Sept. 19, 1961

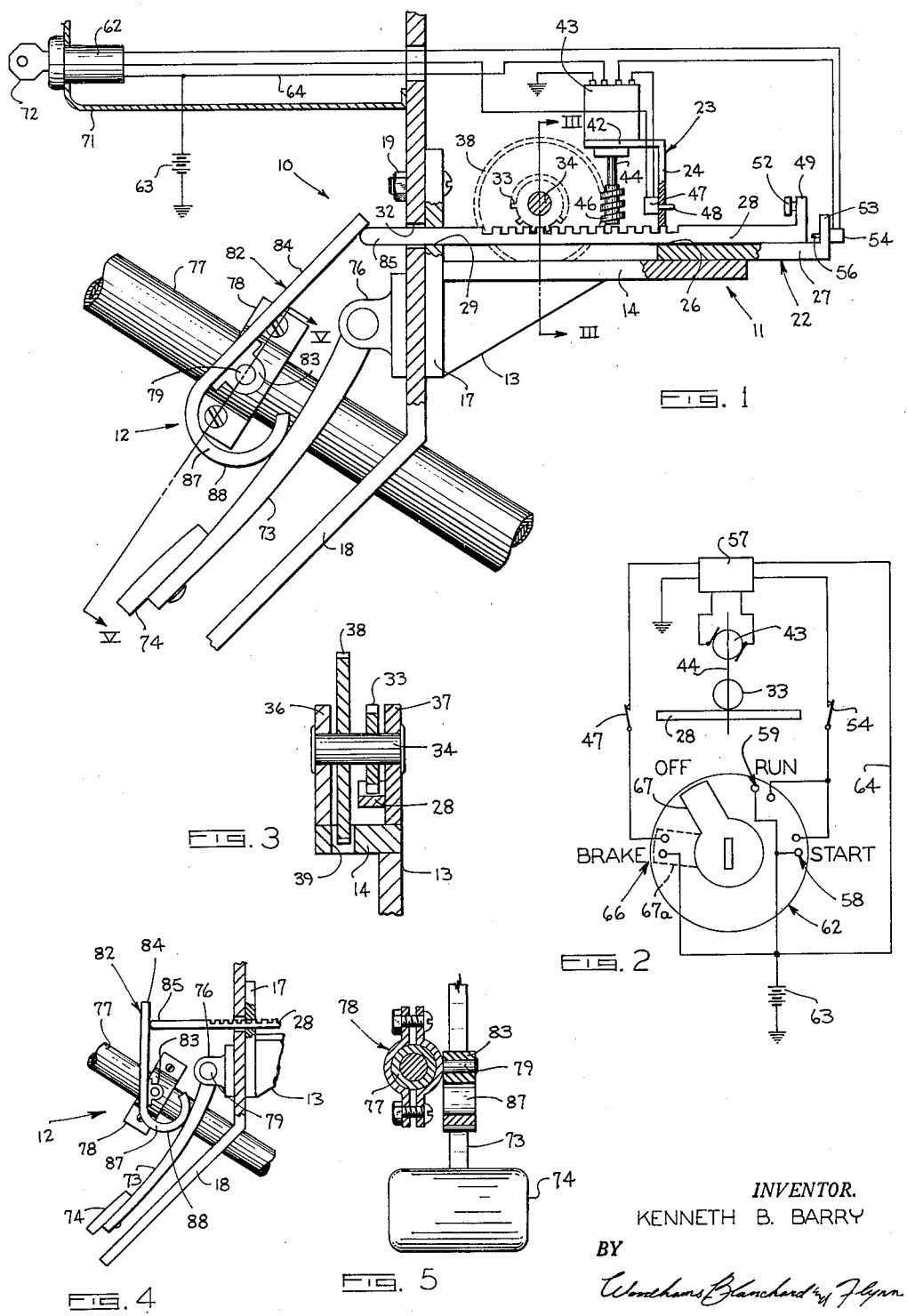

3,000,476
SWITCH OPERATED BRAKE CONTROL
Kenneth B. Barry, 10507 S. Westnedge, Portage
Township, Kalamazoo County, Mich.
Filed May 18, 1959, Ser. No. 813,778
3 Claims. (Cl. 192—3)

This invention relates in general to a device mounted in an automotive vehicle for operating a foot brake of the lever type and, more particularly, to a type of such device which is controlled by the ignition switch of the vehicle.

It is common knowledge that many vehicles are parked by their operators without setting the parking brake, which is contrary to the law in many localities. Often this failure to set the brakes is a mere oversight conditioned by the fact that a vehicle is stopped many times during its normal operation, such as at intersections and in slow moving traffic, when the parking brake is not set. In some instances, failure to use the parking brake is intentional because of the difficulty or inconvenience which is often encountered in applying and releasing the brake.

It is also well known that there are many operators of automobiles who, for physical reasons, are substantially unable to use the conventional parking brake of the vehicles. Furthermore, vehicle operators have been known to become so incapacitated, as in the case of a sudden heart attack, that they are unable to apply any type of brake requiring a substantial amount of strength or leg movement. In fact, many fatal accidents have occurred to such people simply because they were unable to retard the movement of their vehicle. However, regardless of the reason for the failure to use the parking brake, it is apparent that many operators of vehicles are inclined to prevent movement of their parked vehicle by leaving it in gear, even though such procedure is opposed by law enforcement agencies.

It has also been found on numerous occasions that vehicles have been used without the permission of the owner, even though the ignition key has been removed. Many vehicles can be operated normally, if the ignition key can be by-passed by a jumper wire. However, if the parking brake is also locked after it is applied, it follows that the unauthorized use of vehicles will be greatly reduced.

In considering the above problems, it occurred to me that, if a brake applying device could be developed which would be automatically operated by the performance of some other normal function during the starting and stopping of a vehicle, the parking brake would be applied more often. However, it also became apparent that the device should be capable of a safe application of the brake at high speeds, or it would result in damage to the vehicle or injury to its occupants.

Accordingly, a primary object of this invention has been the provision of a brake operating device whereby the brake of a vehicle can be quickly, easily and automatically applied in conjunction with the performance of some other function which must occur at the time that the brake is normally applied and released.

A further object of this invention has been the provision of a brake operating device, as aforesaid, which is positive in operation, which is easy to install, which is relatively inexpensive to manufacture, which requires very little energy to operate, and which does not interfere with any normal function of the vehicle.

A further object of this invention has been the provision of a brake operating device, as aforesaid, which is controlled by the ignition switch of the vehicle so that the brake is automatically and quickly applied when the ignition key is turned to one position, and is released as soon as the ignition key is turned to another position, and which cannot be operated without actually turning the key in the ignition switch.

A further object of this invention has been the provision of a brake operating device, as aforesaid, which is particularly designed for cooperation with a foot operated brake including a pedal lever pivotally supported near one end thereof, regardless of whether such brake operates the normal brake system or a separate emergency brake system.

Other objects and purposes of this invention will become apparent to persons familiar with this type of equipment upon reading the following specification and examining the accompanying drawings, in which:

FIGURE 1 is a central, cross-sectional view of a fragment of an automotive vehicle, including a partially broken, side elevational view of the brake operating device of the invention.

FIGURE 2 is a diagram of the circuitry used in the invention.

FIGURE 3 is a sectional view taken along the line III—III in FIGURE 1.

FIGURE 4 is a fragment of FIGURE 1 in reduced scale showing a different position of operation.

FIGURE 5 is a sectional view taken along the line V—V in FIGURE 1.

For the purpose of convenience in description, the terms "upper," "lower" and derivatives thereof will have reference to the brake operating device of the invention and parts thereof as appearing in FIGURE 1, which is their normal position of operation. The terms "front," "rear" and derivatives thereof will have reference to the right and left ends of the structure appearing in FIGURE 1, which is consistent with the normal direction of movement of the vehicle in which the device is installed. The terms "inner," "outer" and derivatives thereof will have reference to the geometric center of said brake control device and the parts thereof.

*General description*

The objects and purposes of the invention, including those set forth above, have been met by providing a brake operating device comprised of two units, one of which is supported upon the front or engine side of the vehicle fire wall and the other of which is supported upon the steering post thereof. The front unit is comprised of a frame upon which a horizontal rack is supported for sliding movement lengthwise thereof. The rear end of the rack extends through a suitable opening in the fire wall where it engages an actuating arm on a cam pivotally supported upon the steering post. The cam is engaged with the lever arm of the foot operated brake pedal so that pivoting of the cam effects an operation of the brake.

Movement of the rack, whereby the cam is pivoted, is effected by gears which are supported upon the support frame near the fire wall and which are driven by a reversible motor also mounted upon the support frame. The motor is connected in series through one limit switch and an ignition switch to a source of electrical energy, such as the vehicle battery, for rotation in one direction. The motor is also connected in series through a second limit switch and the ignition switch to said battery for rotation in the opposite direction. The normally closed limit switches are arranged so that they are opened by the rack as it reaches the opposite terminal positions thereof in its lengthwise movement. The two limit switches are connected to the ignition switch so that the ignition key must be turned to two different positions to effect energization of the motor in its opposite directions.

*Detailed construction*

The brake operating device 10 (FIGURES 1 and 2) is comprised of a front or actuating unit 11 and a rear or cam unit 12 in one preferred embodiment of the invention. The front unit 11 consists of a support frame 13 having a substantially horizontal plate 14 secured at its rear end to a substantially vertical mounting plate 17 which is in turn secured to the front side of the fire wall 18 of a conventional automotive vehicle by means including the bolts 19. A guide member 22 is mounted upon the plate 17 at its front end and includes an inverted, L-shaped motor bracket 23 at its rear end. The vertical flange 24 of the motor bracket 23 has an opening 26 adjacent to the base plate 27 of the guide member 22 through which an elongated rack 28 slidably extends, the front portion of said rack being slidably supported upon the base plate 27. The rear end of the rack 28 slidably extends through an opening 29 in the mounting plate 27 which communicates with an opening 32 through the fire wall 18. Accordingly, the rack 28 is slidably supported by the mounting plate 17 and base plate 27 for slidable lengthwise movement.

A pinion 33 (FIGURES 1 and 3) is mounted upon a shaft 34 which is rotatably supported upon the horizontal plate 14 between the motor bracket 23 and the mounting plate 17 by means of the shaft supports 36 and 37. The pinion 33 engages the upwardly facing teeth of the rack 28. A relatively large gear 38 is also mounted upon the shaft 34 between the shaft support 36 and the pinion 33, the horizontal plate 14 being slotted at 39 to receive the lower edge of the gear 38.

The motor bracket 23 (FIGURE 1) has an upper, horizontal flange 42 upon which a reversible motor 43 is supported with its shaft 44 extending downwardly through the horizontal flange 42 adjacent to the periphery of gear 38. A worm 46 is supported upon the motor shaft 44 and engaged with the gear 38 for rotation thereof.

A normally closed limit switch 47 (FIGURES 1 and 2) is mounted upon the vertical flange 24 of the motor bracket 23 so that the plunger-type actuator 48 extends forwardly of the front end of the vertical flange 24. The rack 28 has an upstanding flange 49 at its front end upon which a switch operator 52 is adjustably mounted for engagement with the switch actuator 48. The guide member 22 has an upstanding flange 53 at its front end upon which the limit switch 54 is supported so that its plunger-type actuator 56 extends rearwardly of the flange 53 for engagement by the front end of the rack 28.

In this particular embodiment, the front limit switch 54 (FIGURE 2) is connected in series between a relay 57 and the "start" and "run" terminals 58 and 59, respectively, of the ignition switch 62, which terminals are connected through the battery 63 to ground. The battery 63 is also connected by the conductor 64 to the relay 57. The rear limit switch 47 is connected in series between the relay 57 and the brake terminals 66 on the ignition switch 62, which are also connected through the battery 63 to ground. The relay 57 is connected either to the brushes or the field of the motor 43, in a substantially conventional manner, whereby the flow of current to the motor may be reversed by the relay 57, in a conventional manner.

The ignition switch 62 (FIGURE 2) has a wiper 67 which is engageable with the terminals 58, 59 or 66, one set at a time in a conventional manner, for the purpose of connecting the battery 63 to a particular lead from the terminals of the ignition switch.

As shown in FIGURE 1, the ignition switch 62 is supported upon the instrument panel 71 for operation by a key 72 in a conventional manner. A brake lever 73 has a pedal 74 at its lower end and is pivotally supported at its upper end upon the lever support 76, which is mounted upon the rear side of the fire wall 18 in any convenient manner. The pivot axis of the brake lever 73 is normally horizontal, and the lever support 76 is preferably directly below the opening 32 in the fire wall 18.

A steering post 77 extends through the fire wall 18 on one side of the brake lever 73 in a substantially conventional manner.

A clamp 78 (FIGURES 1 and 5), which includes a sidewardly extending, cam pivot post 79, is mounted upon the steering post 77 so that said pivot post 79 is directly above the lever 73 and parallel with the pivot axis thereof. An elongated cam bar 82 is secured between its ends to a bearing member 83 which is pivotally supported upon post 79. The upper end 84 of said bar 82 extends into the path of the rear end 85 of the rack 28. The lower end 87 of the bar 82 is curved to provide a cam surface 88 engaged with the lever 73. Rotation of the bar 82 in a counterclockwise direction, as appearing in FIGURES 1 and 4, produces a downward movement of the brake lever 73, whereby the vehicle brakes are applied.

*Operation*

The brake operating device 10 (FIGURE 1) is easily and quickly installed by providing an opening 32 in the fire wall 18 directly above the brake lever support 76. The support frame 13, including the motor and gears supported thereon, is mounted upon the front side of the fire wall 18 so that the rack 28 extends therethrough. The cam unit 12 is mounted upon the steering post 77 so that the cam bar 82 is properly engaged by the rear end 85 of rack 28. The appropriate electrical connections are made between the motor 43, the limit switches 47 and 54, the ignition switch 62 and the battery 63. The relay 57 may be a part of the motor 43.

With the wiper 67 (FIGURE 2) of the ignition switch 62 in the "off" position the entire system is de-energized. That is, the "start" terminals 58, "run" terminals 59 and "brake" terminals 66 will be open so that the battery 63 will not be connected through the ignition switch 62 to any part of the brake operating circuit. The relay 57 which is connected to the battery by the conductor 64 will also have its terminals (not shown) in the open position so that no current will flow through the relay. When it becomes desirable to operate the brake apparatus, the wiper 67 is moved to the "brake" position, as indicated in broken lines at 67a, so that it electrically connects the brake terminals 66. Current can now flow from the battery 63 through the rear limit switch 47, the relay 57 to ground, whereby the relay automatically connects the conductor 64 from the battery 63 to either the brushes or the field of the motor 43, in a conventional manner. The polarity of this connection is selected so that the resultant rotation of the motor 43 will produce a rearward movement of the rack 28 against the upper arm of the cam bar 82. The resultant rotation of the cam bar 82 around pivot post 79 causes the cam 88 to move the brake lever 73 into the brake applied position appearing in FIGURE 4. As the lever 73 is moved into the applied position, the switch operator 52 supported upon the front end of the rack 28 opens the rear limit switch 47 which de-energizes the motor 43. Thus, regardless of whether the ignition switch 62 remains in the "brake" position or is moved over into the "off" position, the circuitry of the brake operating device 10 will be de-energized.

When it becomes desirable to release the brake, the wiper 67 (FIGURE 2) is moved from the "off" position or "brake" position into either the "run" or "start" positons where it covers either the "start" terminals 58 or "run" terminals 59. In either case, said wiper 67 will connect the relay 57 to the battery 63 through the normally closed front limit switch 54. Such energization of the relay 57 will effect a connection of the motor 43 between the conductor 64 and ground, but in the reverse polarity from the connection which occurred when the wiper 67 was moved into the "brake" position. Accordingly, the motor 43 will be rotated so that the rack 28 is moved frontwardly, thereby releasing its engagement with the cam bar 82. The spring (not shown), which normally raises the brake lever 73, will operate to release the brake while moving said cam bar 82 from its FIGURE 4 position back into its FIGURE 1 position. As the front end of the rack 28 approaches the flange 53 at the front end of the guide member 22, said rack will open the front limit switch 54 and de-energize the relay 57, hence the motor 43.

It will be observed that the release of the brake operating device and de-energization of the motor 43 is effected in exactly the same manner if the wiper 67 is placed on the "run" terminals 59 of the ignition switch 52. Thus, even if the brake is not fully released while the wiper 67 is on the "start" posiiton, it will be released completely shortly after the wiper 67 is released in the conventional manner to the "run" position.

If desired, the relay 57 may be equipped with suitable means (not shown) whereby the motor 43 is rotated at a faster speed in the brake releasing direction than in the brake applying direction. This will serve not only to avoid movement of the vehicle with the brakes applied, but also permits a slower application of the brakes when the vehicle is operating at high rates of speed. Further adjustments, particularly in the brake applying operation, may be effected by means of the switch operator 52. That is, by properly adjusting the switch operator 52, the moment at which the rear limit switch 47 is opened, thereby de-energizing the brake applying circuit, can be accurately and carefully controlled. Moreover, the adjustable switch operator 52 can be utilized to compensate for variations in the adjustment of the foot brake.

It will be apparent that the clamp 78 can be replaced by a device (not shown) for pivotally supporting the cam bar 82 upon the floor, for example, of the vehicle. It will also be apparent that the key 72 can, if desired, be removed from the ignition switch 62 when it is in any of its several positions, and particularly in both the "off" and "brake" positions.

Although a particular preferred embodiment of the invention has been disclosed herein for illustrative purposes, it will be understood that variations or modifications of such disclosure, which lie within the scope of the appended claims, are fully contemplated.

What is claimed is:

1. A device for operating a lever-type brake pedal pivotally supported adjacent to the fire wall of an automotive vehicle having a steering post, comprising: a support frame mountable upon the side of said fire wall opposite from the brake pedal; a rack slidably supported upon said frame for lengthwise movement in a substantially horizontal direction, one end of said rack extending through said fire wall; a motor mounted upon said frame; gear means connecting said motor to said rack for selectively driving said rack in both lengthwise directions; electrical means including a source of electrical energy and switch means controlling the operation of said motor; an elongated bar having at one end a curved portion defining a cam engageable with the brake lever and at its other end an arm engageable by the one end of said rack; a pivot post and clamp means supporting said pivot post upon said steering post parallel with the pivot axis of the brake pedal, said elongated bar being pivotally mounted on said pivot post for movement around an axis parallel with the pivot axis of the brake lever and transverse of said brake lever whereby movement of said rack in one direction operates through said bar to effect movement of said brake lever.

2. In an apparatus for operating a brake lever pivotally supported at one end near the fire wall of an automotive vehicle having a steering post and a key-operated, four-position ignition switch, the combination comprising: a support frame mounted upon the front side of said fire wall near the pivot axis of the brake lever; an elongated rack slidably supported upon said frame for movement lengthwise thereof, one end of said rack slidably extending through said fire wall directly above said lever; a pinion rotatably supported upon said frame and engaged with said rack for effecting lengthwise movement thereof; a gear coaxially rotatable with said pinion and substantially larger in diameter than said pinion; a motor and a motor bracket supporting said motor upon said frame, said motor being reversible and having a shaft adjacent to the periphery of said gear; a worm supported upon and rotatable with said shaft and engaged with said gear; a pair of normally closed limit switches, one switch being mounted upon said motor bracket and the other switch being mounted upon said frame remote from said fire wall; a switch operator on said rack arranged for opening said limit switches as said rack approaches the terminal points in its lengthwise movement; a source of electrical potential connected in series with one position of said ignition switch, one of said limit switches and said motor for rotating same in one direction, said source of electrical potential being connected in series with another position of said ignition switch, the other limit switch and said motor for effecting rotation thereof in the opposite direction; a cam and means pivotally supporting said cam upon said steering post for movement around an axis near to and parallel with said lever axis, said cam being engageable with said lever and having an elongated arm engaged by said one end of said rack, whereby movement of said rack through said fire wall toward said cam arm effects a movement of said lever toward said fire wall.

3. A device for applying automatically the wheel brakes of an automotive vehicle having a fire wall, a brake pedal near the inside of said fire wall and an ignition switch comprising: a support frame mountable upon said fire wall on the side thereof opposite the brake pedal; brake actuating mechanism including an elongated element drivingly engageable with said brake pedal and means supporting said element for pivotal movement around an axis fixed with respect to said fire wall; a motor mounted upon said support frame, said motor being reversible and having a motor shaft; a worm secured on said motor shaft; a worm gear shaft rotatably supported upon said support frame transversely of said motor shaft, and a worm gear secured upon said worm gear shaft and engaged with said worm; a pinion secured on said gear shaft; a rigid, toothed member mounted upon said support frame and engaged with said pinion for movement thereby with respect to said support frame in response to rotation of the worm gear, said toothed member having an integral elongated extension drivingly engageable with said elongated element for effecting said pivotal movement thereof; a source of electrical potential connected to the ignition switch; terminal means in said ignition switch for selectively connecting said motor to said source, whereby said motor is rotated in one direction or the other; normally closed, mechanically operated switch means electrically connected in series with said source and said motor and operatively associated with said toothed member, said switch means being opened to disconnect said motor from said source in response to preselected movement of said toothed member.

References Cited in the file of this patent

UNITED STATES PATENTS

| | | |
|---|---|---|
| 1,903,801 | Adams | Apr. 18, 1933 |
| 1,972,659 | Kopay | Sept. 4, 1934 |
| 2,031,062 | Peabody et al. | Feb. 18, 1936 |
| 2,070,365 | Leventis et al. | Feb. 9, 1937 |
| 2,245,958 | Barr et al. | June 17, 1941 |
| 2,529,076 | Dubreuit | Nov. 7, 1950 |